United States Patent [19]

Harte

[11] 3,973,331

[45] Aug. 10, 1976

[54] MANUAL SELF-TEACHING APPARATUS
[76] Inventor: William Joseph Harte, 11 W. 53rd Terrace, Kansas City, Mo. 64112
[22] Filed: June 3, 1974
[21] Appl. No.: 475,766

[52] U.S. Cl. .................................. 35/9 R; 35/48 A
[51] Int. Cl.² ........................................ G09B 3/08
[58] Field of Search ............. 35/9 R, 9 C, 48 A, 38, 35/34

[56] References Cited
UNITED STATES PATENTS

| | | | |
|---|---|---|---|
| 1,797,744 | 3/1931 | Wiley | 35/48 A |
| 2,060,308 | 11/1936 | Harding | 35/48 A |
| 2,295,818 | 9/1942 | Wistar | 35/48 A |
| 2,540,363 | 2/1951 | Wistar | 35/48 A |
| 3,057,082 | 10/1962 | Wellington | 35/9 C |
| 3,106,027 | 10/1963 | Thelen | 35/9 C |
| 3,127,176 | 3/1964 | Ryan | 35/9 C X |
| 3,177,595 | 4/1965 | Yonker et al. | 35/48 R |
| 3,386,191 | 6/1968 | Michel | 35/38 |
| 3,559,304 | 2/1971 | Kane | 35/48 A |
| 3,747,229 | 7/1973 | Harte | 35/9 R |
| 3,797,134 | 3/1974 | Wingerd | 35/34 |
| 3,902,255 | 9/1975 | Harte | 35/9 R |

Primary Examiner—William H. Grieb
Attorney, Agent, or Firm—D. A. N. Chase

[57] ABSTRACT

A teaching apparatus comprises a unitary plate member presenting a flat, impenetrable upper surface having a plurality of holes therein representing correct answer selections, for example. A pattern of projections on the surface extends upwardly therefrom and receives an instructional sheet having zones thereon for indicating answers selected in response to questions, a stylus being employed by the student to indicate each answer by pushing the stylus against the selected indicator zone. The zones and the areas of the surface therebeneath are aligned so that the stylus meets the surface but does not penetrate the sheet beneath incorrect indicator zones, whereas openings are punched in those zones representing correct answers due to the presence of the holes. The projections, either spaced apart along the boundaries of the areas or formed as a continuous grid, prevent the student from feeling the holes and thereby anticipating the correct answers, but are limited in height so that the stylus penetrates the sheet only at the correct answer zones.

9 Claims, 6 Drawing Figures

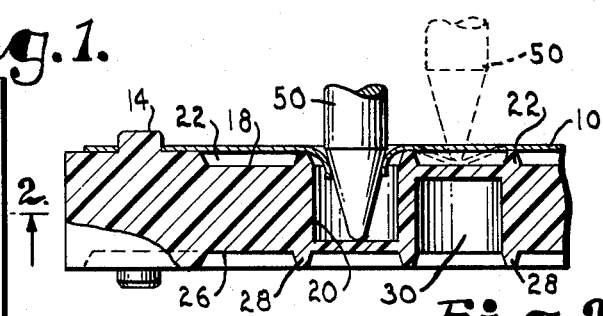
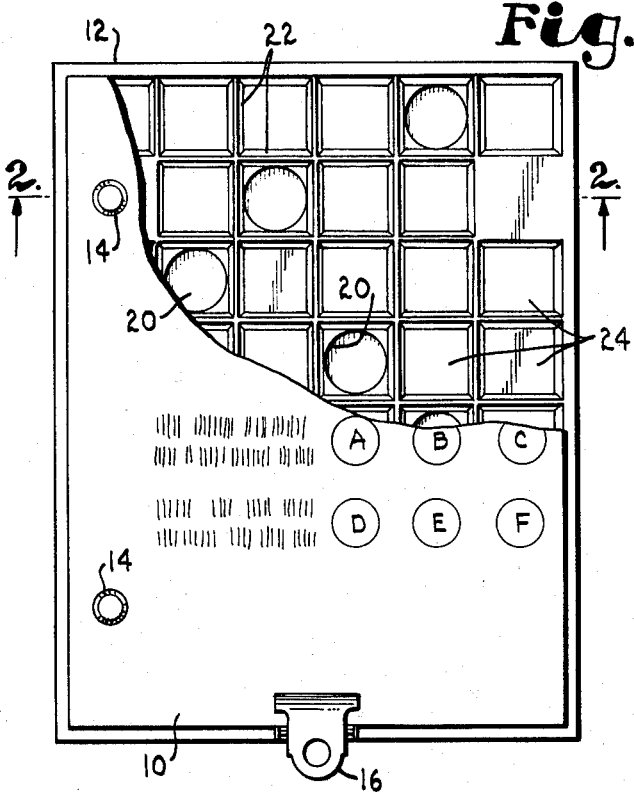
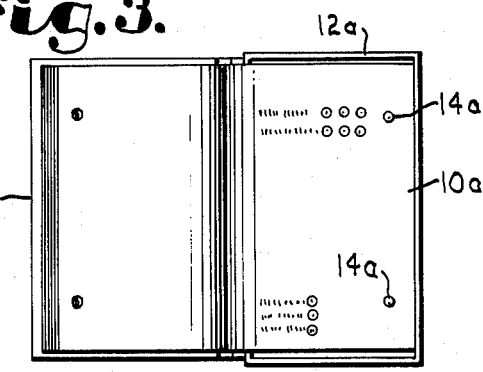
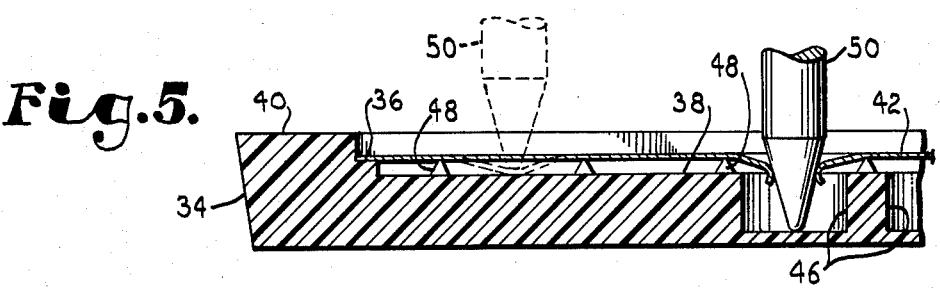
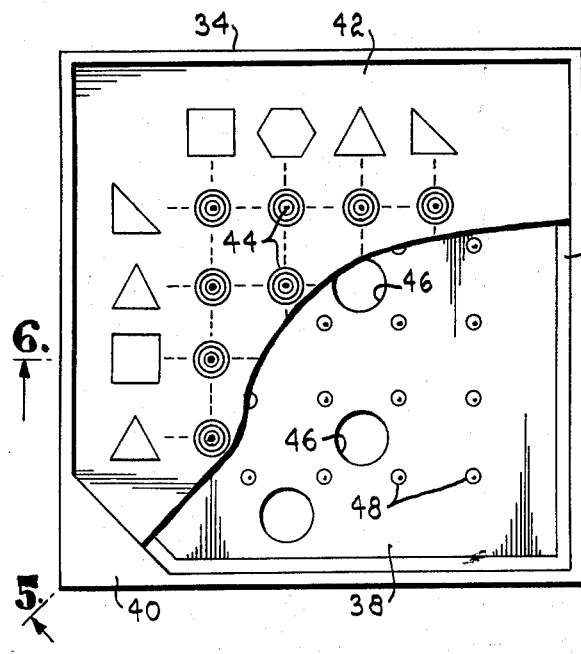
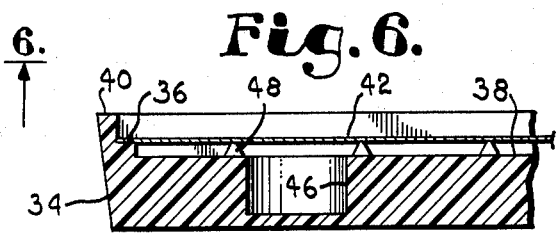

MANUAL SELF-TEACHING APPARATUS

CROSS-REFERENCE

This application is a substitute for the application of William Joseph Harte, Ser. No. 229,641, filed Feb. 28, 1972, and now abandoned.

This invention relates to improvements in self-pacing, immediate feedback, self-teaching apparatus of the type where an instructional sheet containing indicator zones overlies a working surface and selections are made manually with a stylus by pushing against those zones selected by the student in response to the questions presented.

Various types of self-teaching apparatus have been proposed heretofore in which a student employs a stylus to make answer selections on a sheet of paper or the like. One type of answer (either correct or incorrect) is signaled when the student presses the stylus against a selected indicator zone and makes a deep penetration into an underlying hole provided in a frame, holder or suitably shaped plate or testboard beneath the sheet. An answer of opposite character provides a different response as the stylus pierces the selected zone, such as a smaller hole or one of a markedly different shape.

In some instructional situations, however, it is desired that holes be punched by the stylus for only one type of answer. Particularly in working with underprivileged or mentally handicapped students who have difficulty comprehending what the normal student takes for granted, penetration exclusively when a correct answer is selected is especially useful as an aid to instruction. In these cases an instructor oftentimes has difficulty communicating with the student, even sufficiently to teach a slow learner to discern between types or sizes of holes created in an answer sheet.

Although it would seem to be a relatively simple matter to design a testing device where the underlying support for the answer sheet either presents an impenetrable surface or a hole or cavity into which the stylus may enter, a problem is encountered in that such an arrangement permits the student to feel the underlying working surface through the sheet. By passing the fingers over the top of the sheet, the presence or absence of underlying holes may be easily felt and, therefore, correct and incorrect answer selections become discernible even to a student in the slow learner category.

It is, therefore, an important object of the present invention to provide a manual self-teaching apparatus of the general type discussed above where the student cannot anticipate correct answer selections by feel.

As a corollary to the foregoing object, it is an important aim of this invention to provide apparatus as aforesaid wherein penetration of indicator zones on the instructional sheet is effected only in response to one type of answer selection, the opposite selection being indicated by failure of the stylus to produce a punched opening in the answer sheet.

Another important object of the invention is to provide an apparatus as aforesaid wherein the instructional sheet is held slightly above the working surface in a manner to permit the sheet to deflect in response to those answer selections where a punched opening is not to be produced.

Still another important object of the invention is to provide projections on the working surface arranged so as to both prevent anticipation by feel and provide for the deflection of the sheet as in the foregoing object, but without interfering with the action of the stylus in punching a pronounced opening in an indicator zone corresponding to an answer of opposite character.

Furthermore, general objects of this invention are to produce a manual self-teaching apparatus which is simple in construction and manufacture, free of maintenance problems, structurally strong and durable, reliable in use, easy and efficient to operate, and adaptable to a wide range of instructional formats with accompanying questions.

In the drawings:

FIG. 1 is a top plan view of one embodiment of the present invention, a portion of the instructional sheet being broken away to reveal the construction of the underlying plate member;

FIG. 2 is a somewhat enlarged, fragmentary, cross-sectional view taken along line 2—2 of FIG. 1 and illustrating the action of a stylus;

FIG. 3 is a plan view illustrating use of the plate member of FIG. 1 with an instructional sheet that forms a page of a book;

FIG. 4 is a plan view of a second embodiment of the present invention, a portion of the instructional sheet being broken away to reveal the construction of the underlying plate member;

FIG. 5 is an enlarged, fragmentary, cross-sectional view taken along line 5—5 of FIG. 4 and illustrating the action of a stylus; and FIG. 6 is an enlarged, fragmentary, cross-sectional view taken along line 6—6 of FIG. 4.

Referring to FIGS. 1 and 2, an instructional sheet 10 is shown overlying a rectangular plate member 12 which is adapted to be supported on a suitable surface such as a desk or table top (not shown). The instructional sheet 10 may, for example, be imprinted with both instructional material and multiple choice questions and such is illustrated in FIG. 1. A horizontal row of three circular indicator zones identified A, B and C presents three answer selections to one question, and a second row of zones D, E and F similarly provides three possible answer selections for another question. Two alignment posts 14 provide a means of holding the sheet 10 on the member 12 with the indicator zones properly located with respect to the member 12, as will be discussed. The posts 14 are at a location other than the centerline of member 12 to insure correct positioning of sheet 10 on member 12 and they may be in the form of integral protuberances received by corresponding circular openings in sheet 10. An auxiliary hold-down is also illustrated and comprises a spring-loaded clip 16 mounted at the edge of the member 12, which is optional but may be employed if desired.

The plate member 12 is preferably of unitary, plastic construction formed by injection molding, but could also be fabricated by other techniques such as compression molding, casting, chemical foaming, etc. Member 12 has a flat upper surface 18 which is impenetrable except at locations where circular holes 20 are present. These are the correct answer locations that are aligned with the indicator zones on the sheet 10 corresponding to correct answer selections. It should be understood, however, that the opposite relationship may be employed in the present invention, in which case the holes 20 would appear exclusively at incorrect answer locations. For the purposes of the present description it will be assumed that the holes 20 correspond to correct answers, which is currently the preferred arrangement.

A pattern of projections extending upwardly from the flat surface 18 is provided by a lattice of intersecting ridges 22. As is clear in FIG. 1, the lattice is in the form of a uniform grid that divides the surface 18 into a number of discrete, conriguous areas 24. The various ridges 22 define the boundaries of these areas 24, and each area 24 represents a possible answer selection whose character is determined by the presence or absence of one of the holes 20. Accordingly, each square area 24 either defines an impenetrable portion of the surface 18 or contains one of the circular holes 20 within its boundaries. All of the holes 20 extend downwardly from the plane of the surface 18 a substantial distance but not completely through the plate member 12 in order to prevent a student from holding the assembled sheet and member to the light to anticipate correct answers, and also to provide reversibility. In this latter respect, it should be noted that the lower surface 26 is similar to the upper surface 18 including the integral ridges 28 thereon and a circular hole 30 seen in FIG. 2; thus the plate member 12 may be inverted to provide a second arrangement of holes 30 appearing at different relative locations than the holes 20 for the purpose of accommodating different answer sheets with varying patterns of correct answer locations.

FIG. 3 illustrates the versatility of the plate member 12a of the present invention in that its relatively thin, flat silhouette enables it to be placed between the pages of a book 32 wherein the instructional sheet 10a forms one of the pages of the book 32. The other pages provide other answer sheets and the book arrangement allows all of the sheets to be bound together to present a series of instruction for a particular student. The plate member 12a is unchanged except that the clip 16 is omitted and alignment posts 14a are employed adjacent the free edges of the instructional sheets due to the presence of the binding.

Referring to FIGS. 4–6, the plate member 34 there illustrated is functionally similar to the plate member 12 of the embodiment of FIGS. 1 and 2. Instead of the alignment posts 14, however, the member 34 is provided with an internal, peripheral ledge 36 above the plane of the upper surface 38 but below the rim 40 of the member 34. As is clear from a comparison of FIGS. 4, 5 and 6, the ledge 36 circumscribes the working surface 38 and forms a square border except for the lower lefthand corner of the member 34 as viewed in FIG. 4. This corner is cut off so that the instructional sheet 42 will be supported on the ledge 36 in only one orientation to assure proper alignment. Accordingly, in the embodiment of FIGS. 4–6, the sheet 42 is received within the plate member 34 and framed by the rim 40, with the peripheral edge of the sheet 42 resting on the ledge 36 and with the cutoff corners of both the sheet and the ledge matched.

The instructional sheet 42 illustrates a geometric matching test as evidenced by the vertical and horizontal rows of geometric figures. "Bullseye" indicator zones 44 show the student where the stylus is to be applied in matching the figures. The surface 38 beneath the sheet 42 is provided with a number of circular holes 46 corresponding to correct answer locations, such holes 46 serving the same function as the holes 20 in the embodiment of FIGS. 1 and 2.

Instead of a grid of continuous ridges, a pattern of projections 48 integrally formed on the surface 38 serve to support the sheet 42 in spaced relationship with the surface 38 and in a common plane with the ledge 36. Viewing FIG. 4, imaginary lines drawn through the centers of the projections 48 describe a uniform grid in the same manner as the ridges 22 in the first embodiment. The projections 48 are centered at the corners of the squares of such grid, and these squares present discrete, contiguous square areas of surface 38 corresponding to possible answer selections. As may be seen in FIGS. 5 and 6, the projections 48 are of generally conical configuration.

In use, a stylus such as illustrated at 50 is forced against the selected indicator zones and a response feedback is instantaneously obtained. In the embodiment of FIGS. 1 and 2, the stylus 50 shown in full lines in FIG. 2 is seen punching an opening in the sheet 10 as the tip of the stylus is received deep within the hole 20. In contrast to this effect, the stylus 50 in broken lines is shown engaging the sheet 10 but no hole is punched due to the presence of the surface 18 directly beneath that particular indicator zone. The ridges 22 are tapered and are limited in height to an extent to permit the paper sheet 10 to deflect as illustrated by the broken lines without being penetrated by the tip of the stylus. The natural flexibility of paper permits adequate deflection under the applied force of a stylus with a blunted tip as illustrated, with the result being that the paper beneath the stylus tip flexes downwardly into contact with the surface 18 without perforating. The same action is ilustrated in FIG. 5 where the paper sheet 42 is supported on the spaced projection 48.

Although the ridges 22 (and 28) and the projections 48 are limited in height in order to permit the paper sheet to deflect as discussed above, the elevation of the sheet above the surface is sufficient to prevent the student from feeling the holes 20, 30 or 46. If the student attempts to feel the underlying holes by pushing downwardly on the paper sheet with the tips of the fingers, he risks exposure since the paper must be deflected and, if a hole is present, then it is likely that the fingertip will perforate. On the other hand, if only a light touch is used in an attempt to cheat, then all of the indicator zones will feel the same. Accordingly, the objectives of the present invention are attained in an uncomplex and durable plate construction without impairing the ease of operation neccessary for self-teaching devices of this type.

Having thus described the invention, what is claimed as new and desired to be secured by Letters Patent is:
1. Educational apparatus comprising:
    an instructional sheet having zones thereon for indicating answers selected in response to questions;
    a plate member provided with a flat, normally upper surface having a plurality of holes extending into said member from the plane of said surface for representing answer selections of a given type;
    a pattern of projections on said surface extending upwardly therefrom for receiving said sheet in overlying relationship with said projections;
    means on said member for holding said sheet on said projections in a correct position where predetermined zones are aligned with said holes in accordance with the answers represented by said zones,
    said projections supporting said sheet above said surface and spacing said sheet sufficiently therefrom to prevent a student from feeling said holes through said sheet; and
    a stylus for punching through said predetermined zones into the holes therebeneath, whereby the stylus and the holes cooperate to provide a response feedback, said projections being limited in height so that said stylus will penetrate said sheet only at said predetermined zones overlying said holes, and arranged to permit deflection of said sheet into contact with said surface in response to engagement by the stylus at zones on said sheet other than said predetermined zones.

2. The apparatus as claimed in claim 1, wherein said pattern of projections defines the boundaries of a number of discrete, contiguous areas of said surface representing possible answer selections, said holes communicating with certain of said areas.

3. The apparatus as claimed in claim 2, wherein said projections comprise a lattice of intersecting ridges extending along said boundaries.

4. The apparatus as claimed in claim 2, wherein said projections are spaced from one another along said boundaries.

5. The apparatus as claimed in claim 4, wherein each of said projections is of generally conical configuration.

6. The apparatus as claimed in claim 1, wherein said projections comprise a lattice of intersecting ridges defining the boundaries of a number of discrete, contiguous areas of said surface representing possible answer selections, said holes communicating with certain of said areas.

7. The apparatus as claimed in claim 1, wherein said pattern defines the boundaries of a number of discrete, contiguous areas of said surface representing possible answer selections, said projections of said pattern being spaced from one another along said boundaries, said holes communicating with certain of said areas.

8. The apparatus as claimed in claim 1, wherein said projections are integral with said member, the latter and the projections presenting a unitary structure.

9. The apparatus as claimed in claim 1, wherein said instructional sheet is one of the pages of a book, said member being constructed to fit between the pages of the book.

* * * * *